United States Patent [19]

Juy

[11] Patent Number: 4,580,327

[45] Date of Patent: Apr. 8, 1986

[54] METHOD FOR MANUFACTURING AND MOUNTING ORGANS FOR ROTATION BETWEEN CHEEKS AND THE PRODUCTS OBTAINED, TO BE MORE PARTICULARLY USED FOR STRETCHING AND WINDING THE CHAIN IN THE GEAR SHIFT DEVICES FOR BICYCLES AND SIMILAR VEHICLES

[75] Inventor: Henri Juy, Dijon, France

[73] Assignee: Etablissements le Simplex, France

[21] Appl. No.: 706,646

[22] Filed: Feb. 25, 1985

[30] Foreign Application Priority Data

Mar. 12, 1984 [FR] France .................. 84 04230

[51] Int. Cl.[4] .................. B23P 17/00; F16H 9/00
[52] U.S. Cl. ...................... 29/418; 29/413; 474/80
[58] Field of Search ............ 29/418, 413, 412; 474/80, 134, 82

[56] References Cited

U.S. PATENT DOCUMENTS

| | | | |
|---|---|---|---|
| 3,402,942 | 9/1968 | Shimano et al. | 474/134 |
| 4,198,874 | 4/1980 | Nagano et al. | 474/134 |
| 4,226,131 | 10/1980 | Yamasaki | 474/134 |
| 4,433,963 | 2/1984 | Shimano | 474/80 |
| 4,459,256 | 7/1984 | Ziegler | 29/413 |
| 4,506,426 | 3/1985 | Booker | 29/413 |

FOREIGN PATENT DOCUMENTS 330840  6/1930  United Kingdom .............. 29/413

*Primary Examiner*—Mark Rosenbaum
*Assistant Examiner*—Steven Nichols
*Attorney, Agent, or Firm*—Eric P. Schellin

[57] ABSTRACT

The object of the invention pertains more particularly to the art units of the manufacturing of rotary organs for the production and assembly of organs of plastics. The method is characterized in that toothed rotary organs (2) are made by molding directly with their rotational axis (1a) and their supporting cheek (1), and that a countercheek (3) is then made which is equipped for receiving for free rotation the toothed organs (2) and designed for a forced fit on the axis (1a) after the two cheeks have been brought nearer under pressure towards one another, in order to cause the fastening portions (2d) which connect the axes (1a) with the organs (2) to be broken off. The invention is more particularly to be used with the chain guide means of the gear shift devices of bicycles and similar vehicles.

7 Claims, 5 Drawing Figures

FIG. 1
FIG. 3
FIG. 2
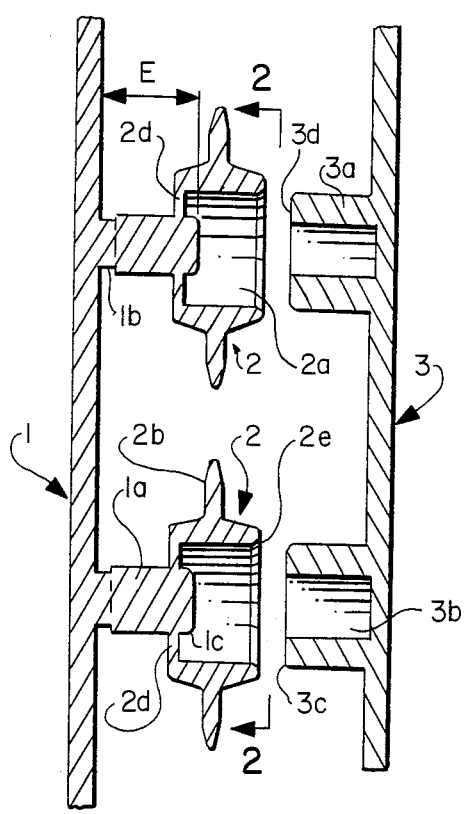
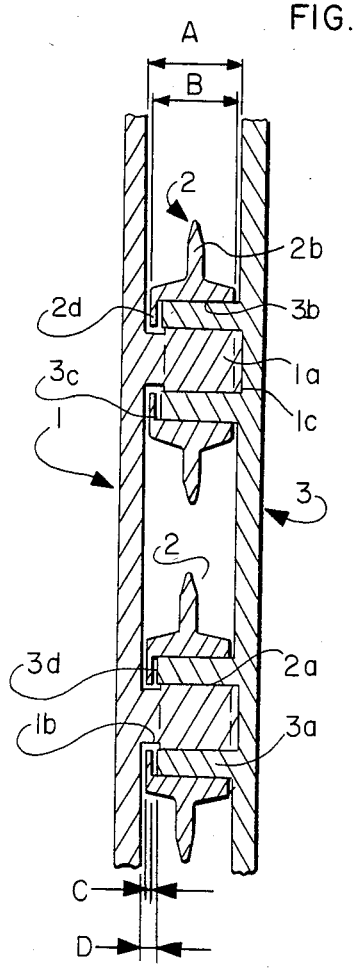
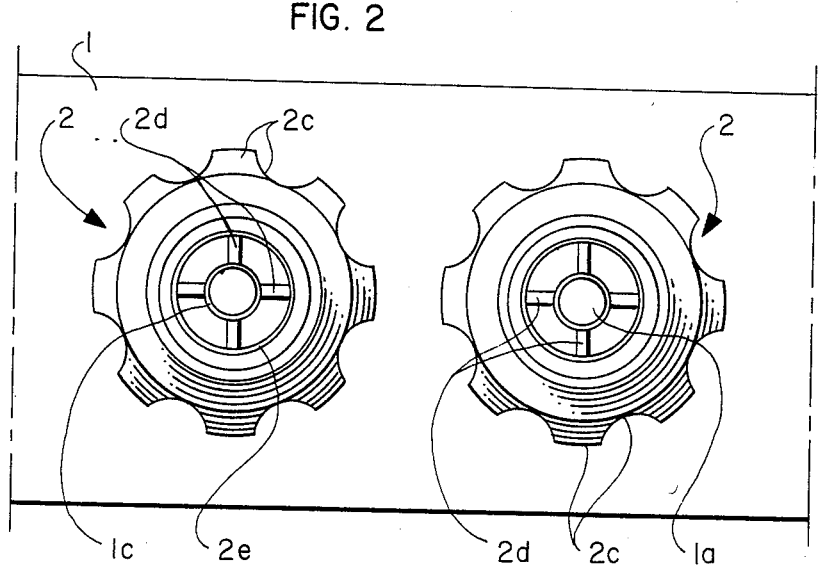

METHOD FOR MANUFACTURING AND MOUNTING ORGANS FOR ROTATION BETWEEN CHEEKS AND THE PRODUCTS OBTAINED, TO BE MORE PARTICULARLY USED FOR STRETCHING AND WINDING THE CHAIN IN THE GEAR SHIFT DEVICES FOR BICYCLES AND SIMILAR VEHICLES

The invention relates to the manufacture of toothed, cogged or other rotary organs for multiple and various uses, the shaping and the assembly of organs of plastics, the driving systems and means for the vehicles, more particularly the bicycles and the like.

Rotary toothed or not toothed, cogged or not cogged organs for rotation between cheeks are involved in various fields of many industrial manufacturing procedures. For instance, this is the case with the stretching and winding arm for the chain in the gear shift devices for bicycles or similar vehicles. This arm is comprised of one or generally two peripherally smooth or cogged rollers which are mounted for free rotation on pins assembled to cheeks between which the rollers are freely rotated. In this case, the arm is pivoted under the thrust of an elastic means, in an adequate direction in order to hold the arm cleared from the chain, sufficiently stretched regardless of the gear of the free wheel about which the chain is would.

In this case, the arm assembly is comprised of some ten parts, and it is necessary to manufacture them separately, and then to assemble them. The cost of manufacture, and the cost of the time necessitated by the assembly and the mounting of the parts, are comparatively very high.

In accordance with the invention, and taking into account the general requirements concerning the standardization of the manufacturing procedures and the cutting down of the manufacturing costs, in order to obviate the aforesaid drawbacks, there has been designed the manufacturing and mounting process which is chiefly characterized in that a first cheek is made by molding, preferably by injection, and is formed one piece with one or more projecting tenons on one face of said cheek and with one or more organs intended for rotation, each one of them being connected to a tenon by one or more fastening portions; there is also made a second cheek by molding, preferably by injection, which is formed one piece with one or more projecting bearing portions on one face of said second cheek each one of the bearing portions being arranged to be engaged within the central cylindrical housing and a rotary organ clamped by driving in on the corresponding tenon of the first cheek; the cheeks which have been thus made are brought nearer towards one another and the bearing portion or portions of the second cheek are engaged under a suitable pressure within the central cylindrical housing or housings of the rotary organ or organs, the said bearing portion or portions being then engaged on the corresponding tenon or tenons while causing automatically the disengagement, during this step, of the fastening portions which connect the rotary organs with the tenons, releasing therefore the rotary organ or organs, which can then be driven for free rotation about the bearing portions.

The advantages resulting from this invention are chiefly that not only the manufacture is simplified as much as possible, but also that a practically instantaneous assembly or mounting is made possible thereby, without requiring any adjustment or other operational procedures, whereas it was necessary, up to now, to assemble some ten various parts for constituting a similar assembly.

The invention is described more fully in the following specification with reference to the attached drawings, in which one form of embodiment only is shown.

FIG. 1 is a general sectional view, in a form given as an example, an assembly of two cheeks illustrated separately, with the complementary parts and rotary organs connected to the tenons of one of the cheeks.

FIG. 2 is a side view considered along the line 2—2 of FIG. 1.

FIG. 3 is a view similar to FIG. 1, wherein the cheeks have been brought nearer towards one another, the complementary parts have been engaged forcedly, and the rotary organs have been released.

Figure 4:
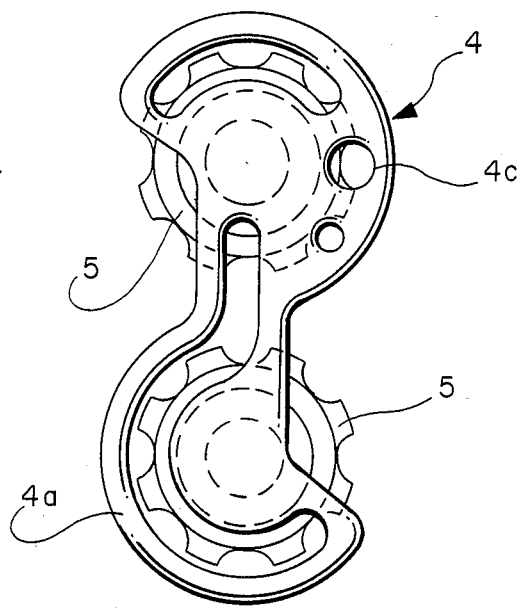
FIG. 4 is a side view of an embodiment of the assembly including the cheeks and the rotary organs made an assembled in accordance with the invention, in the form of a chain stretching and winding arm for a gear shift device in a bicycle.

The object of the invention is set forth with more details by describing the procedure illustrated in the form of embodiment of FIGS. 1 to 3.

FIG. 1 is a view illustrating an assembly comprised of two parts made each one by injection molding preferably, and in a manner which is particularly desired, without however being limitative.

The first part includes a cheek (1) in any form apertured or not, with any external contour, and of any size, as may be required by the use contemplated. The external contour illustrated in part in FIG. 2 is an example only.

The first cheek (1) is formed one piece with the projecting tenons (1a) on one face of this cheek. At the bottom of each one of the tenons (1a) there is formed a groove or circular clearance (1b) arranged to facilitate the mounting, without interfering afterwards with the rotation of the rotary organs. The end of the tenons (1a) is bevelled at (1c).

Parts (2) are also made one piece with the cheek (1) and the tenons (1a). The parts (2) are intended for constituting the rotary organs, and they are contoured accordingly. In the example illustrated, the body of the organs (2) is provided with a central cylindrical housing (2a) and a disk (2b) formming at the periphery thereof the cogs (2c). Instead of the cogs (2c), the periphery could be smooth, or could form a gear toothing or other configurations. Preferably, the housing (2a) is provided at the open end thereof with a bevel (2e).

The organs (2) are connected each one to a tenon (1a) by means of fastening tongues (2d) which are clearly shown in FIGS. 1 and 2. Instead of the tongues, the number of which may be varied, the connection could be provided for instance by means of a solid membrane.

As will be set forth hereinafter, the fastening tongues or portions (2d) must be broken at the time of the assembly, in order to release for rotation the organs (2). This breaking off takes place normally at (2d) at the level of the faces of the tenons. Breaking off may be made easier at the accurate point as desired, for instance by forming a weakening line at this point of the section of the tongues (2d), by means of a suitable arrangement of the mold.

The second cheek (3) is formed one piece with recessed bearing portions (3a) projecting from a face of this cheek. In each one of the bearing portions (3a) there is formed a housing (3b) intended for being adapted by close driving in on the corresponding tenon (1a).

The bearing portions (3a) have a cylindrical external configuration for engagement within the housings (2a) of the organs (2), the adjustment permitting the free rotation of the rotary organs (2) after the assembly. The end of the bearing portions (3a) has preferably a bevel (3c).

After the manufacturing of the two cheeks (1 and 2) with their complementary parts and organs (2), the assembly or mounting is carried out in a particularly quick manner by bringing nearer towards one another the cheeks and the various parts thereof with the organs (2), and by engaging with a suitable pressure the bearing portions (3a) within the housings (2a) and on the tenons (1a), with the simultaneous breaking off at (2d), during this engagement step, of the tongues (2d) under the thrust of the face (3d) at the end of the bearing portion (3a). The organs (2) are thus released and can be rotated about the bearing portions (3a). It is the end of the tenons (3a) which comes in abutment at the bottom of the housings (3b).

It will be obvious that for the good operation of the assembly of cheeks and rotary organs, the dimensioning for assembling the various parts must be carefully established in order to meet the following requirements:

when the end of the tenons (1a) comes into abutment at the bottom of the housings (3b), the interval (A) between the internal faces of the cheeks (1 and 3) must be higher than the width (B) of the rotary organs (2), while the dimension (D) between the internal face of the cheek (1) and the face (3d) at the end of the bearing portions (3a) is appreciably higher than the thickness (C) of the tongues (2d);

the length (E) of the tenons (1a) beyond the internal face of the cheek (1) must be equal to the length of the housings (3b) and to the dimension (D) together;

the organs (2) must be so adjusted as to be rotated freely on the bearing portions (3a);

the thickness of the tongues (2d) (or membranes) must be placed within the interval (D) normally with some clearance with respect to the internal face of the cheek (1) and to the face (3d);

the tenons (1a) and the housings (3b) are to be engaged together by forced driving in providing the assembly and preventing any accidental separating of the cheeks. When repair is needed, the whole assembly is changed, taking into account the very economical cost of this assembly.

The tenons (1a) and the housings (3b) have a cylindrical configuration, however, they could be shaped otherwise in the section, but the grove (1b) must remain circular as already stated.

There has been illustrated an assembly with two tenons, two bearing portions, two rotary organs or rollers. As an alternative form of embodiment, the assembly may be designed in the component parts thereof so as to have one rotary organ or roller only, or more than two organs or rollers.

Figure 5:
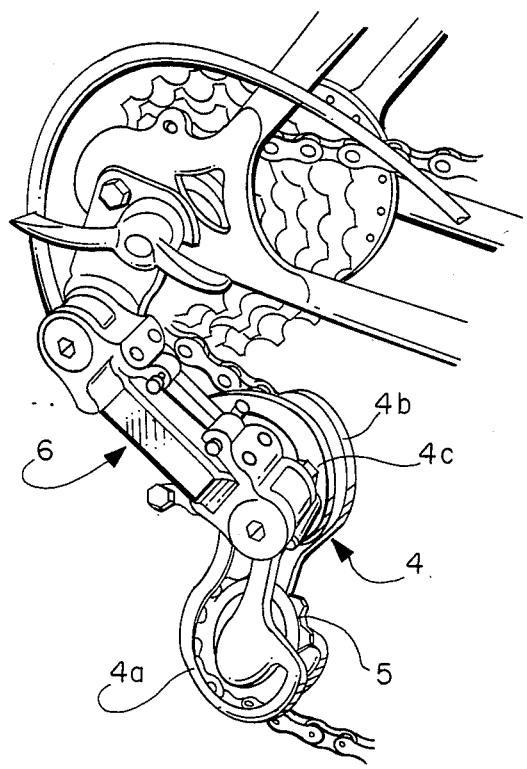
FIG. 5 is a perspective view of the same assembly as the one of FIG. 4, equipping a gear shift device for bicycle, illustrated as an example only.

Many uses can be found for the assembly according to the method and the characteristics of the invention. In an interesting and particularly desired manner, it is possible, with this assembly, to provide chain winding and stretching arms for the gear shift devices in bicycles or like vehicles, for instance in the form of embodiment shown in FIGS. 4 and 5.

There may be seen in these Figures the winding arm assembly denoted by (4) which consists of the two cheeks (4a-4b) and of the rotary organs or rollers (5), manufactured and mounted in accordance with the characteristics of the invention. The cheek (4a) is arranged to have at (4c) a part assembled hingedly with the transversal shifting means of the gear shift device, said means in the non-limiting example illustrated, being a system with hinged parallelogram (6).

The cheeks and the rotary organs can be made of "DELRIN" or of other plastics with suitable characteristics, or possibly of metal or alloy, or also of a combination of both.

The invention is not limited in any way to the use nor to the form of embodiment of the various parts thereof which have been more particularly described, and any alternative form of embodiment remains within the scope of the invention.

I claim:

1. Method for manufacturing and mounting organs for rotation between cheeks, characterized in that a first cheek (1) is made by molding, and preferably by injection, said first cheek being formed one piece with one or more tenons (1a) projecting from one face of said cheek, and with one or more organs (2) intended for rotation, and connected each one to a tenon (1a) by one or more fastening portions (2d), there being also made by molding, preferably by injection, a second cheek (3) which is formed one piece with one or more bearing portions (3a) projecting from one face of said second cheek, each one of the bearing portions being contoured for engagement within the central cylindrical housing (2a) of a rotary organ (2) and by close driving in on the corresponding tenon (1a) of the first cheek (1), the cheeks thus manufactured being brought nearer towards one another with engagement under a suitable pressure of the bearing portion or portions of the second cheek within the central cylindrical housing or housings of the rotary organ or organs, and then with engagement of the said bearing portion or portions on the corresponding tenon or tenons, while causing automatically during this step the breaking off of the fastening portions connecting the rotary organs with the tenons, whereby the rotary organ or organs are released and can then be driven for free rotation around the bearing portions.

2. Cheek as claimed in claim 1, which is manufactured one piece (1) by molding, preferably by injection, with tenons (1a) projecting from one face and with one or more organs (2) intended for rotation, each one of them being connected with a tenon by one or more festening portions.

3. Cheek is claimed in claim 2, and having a circular clearance or groove (1b) at the bottom of each one the tenons (1a), the end of which is bevelled.

4. Cheek as claimed in claim 2, the organ or organs (2) of which is or are intended for rotation, the body of said organ or organs being provided with a bevelled central cylindrical housing (2a) and with a disk (2b) or other extension of the body, the periphery of which can be smooth, cogged or toothed, fastening tongues (2d) being formed between the organs (2) and the tenon (1a), these tongues being arranged to be broken off.

5. Cheek as claimed in claim 2, and provided with a weakening line (2d) which facilitates the breaking off at the points where the tongues are connected to the face of the tenons (1a).

6. Cheek as claimed in claim 2, which is manufactured one piece (3) by molding, preferably by injection, with one or more recessed bearing portions (3a) projecting from one face of the cheek, a housing (3b) being formed within each bearing portion for adaptation by close driving in on a corresponding tenon (1a) of the first cheek (1), the bearing portions (3a) having a cylindrical external configuration for cooperation with the housings (2a) of the rotary organs.

7. Cheek as claimed in claim 6, the end (3c) of the bearing portions (3a) of said cheek being bevelled.

* * * * *